Nov. 24, 1970  J. E. JOHANSON ETAL  3,543,107
LOW-LOSS, EXTENDED-RANGE, TUNEABLE FIXED CAPACITOR
Filed June 25, 1969
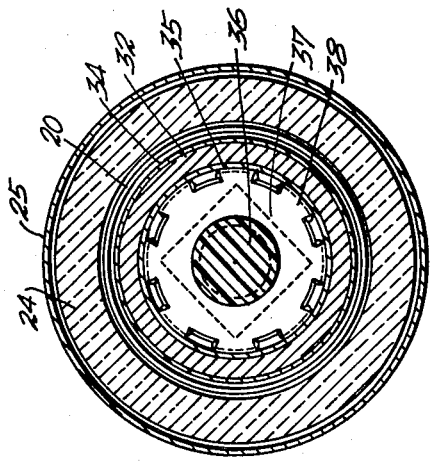
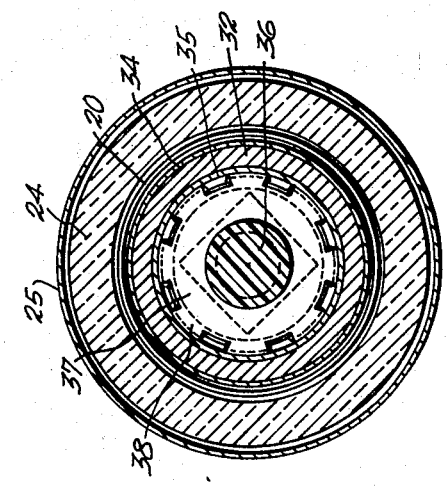
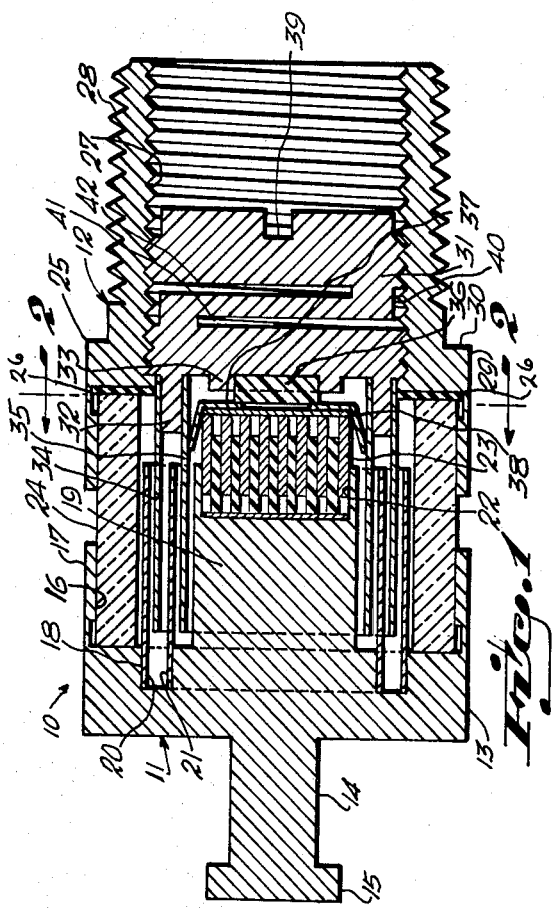
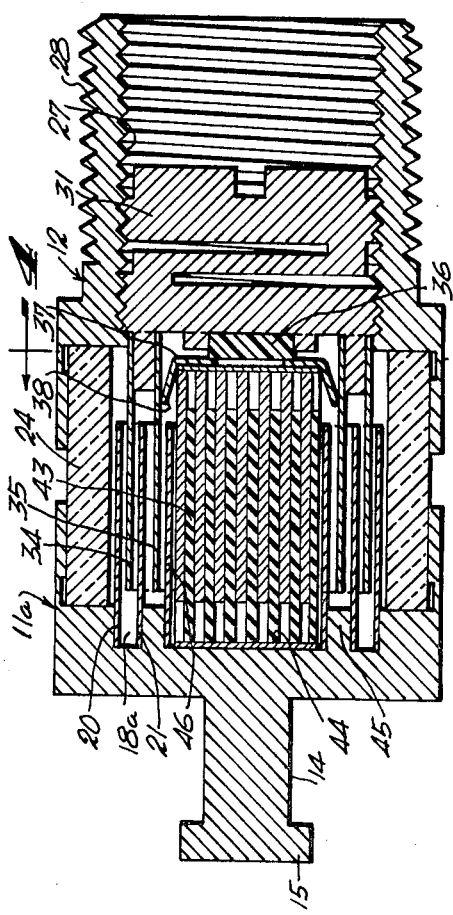
INVENTORS
JOHN E. JOHANSON
NORMAN ERIC JOHANSON
BY
James J. Cannon
ATTORNEY.

United States Patent Office 3,543,107
Patented Nov. 24, 1970

3,543,107
LOW-LOSS, EXTENDED-RANGE, TUNEABLE FIXED CAPACITOR
John E. Johanson, Boonton, and Norman Eric Johanson, Morristown, N.J., assignors to Johanson Manufacturing Corporation, Boonton, N.J.
Filed June 25, 1969, Ser. No. 836,287
Int. Cl. H01g 5/04
U.S. Cl. 317—251                          10 Claims

ABSTRACT OF THE DISCLOSURE

A low-loss, extended-range, tuneable fixed capacitor is described, including rotor and stator end support members held in axially-spaced relation by means of a ceramic support tube, end portions of which press-fitted in cylindrical openings in said end members, wherein tubular capacitor plates are concentrically arranged in intermeshed relation within the ceramic support tube and secured in place by end portions thereof being press-fitted with respect to annular wall surfaces of annular recesses provided in said rotor and stator end support members to constitute the air capacitance portion of the capacitor, and wherein a capacitor chip member located centrally within the intermeshed capacitor plates is electrically connected in parallel with the air capacitance portion to provide a high Q, high capacitance tuneable tubular capacitor of extraordinarily small physical size.

---

This invention relates to electrical capacitors and is directed particularly to a low-loss, extended range, tuneable fixed capacitor wherein a fixed capacitor chip member is utilized in combination with a tuneable air capacitance portion of the capacitor to achieve higher total capacitance consistent with high Q performance in a smaller unit as compared with tuneable capacitors of the type presently known.

Heretofore, in the manufacture of cylindrical glass trimmer capacitors and the like, increase in overall capacitance was achieved by adding additional intermeshing tubular capacitor plate elements, resulting in a corresponding increase in overall size. Such increase in size to achieve greater capacitance necessarily introduces increased distributed inductance, resulting in a lowering of the Q factor, i.e., a lower figure of merit of the capacitor. Since, especially in high-frequency circuitry, it is of utmost importance in many instances that the capacitor Q be kept at a high value, it is the principal object of this invention to provide a tuneable capacitor of increased capacitance while at the same time maintaining a high Q by combining a capacitor chip member with the air capacitance portion of a tubular fixed capacitor of the character described in such manner as to maintain the overall size of the capacitor at a minimum.

A more particular object of the invention is to provide a low-loss, extended-range, tuneable fixed capacitor or trimmer capacitor of the character described wherein the fixed capacitor chip member is located within the cylindrical zone defined by the innermost rotor tubular capacitor plate, the inner end of the capacitor chip member being fixed to and electrically connected with respect to the stator end support member and the outer end of the chip member being electrically connected with the inner surface of said innermost rotor tubular capacitor plate by friction contact brush means permitting relative axial movement, whereby the capacitor chip member will always be connected in parallel, electrically, with respect to the air capacitance portion of the extended range capacitor.

Other objects, features and advantages of the invention will be apparent from the following description when read with reference to the accompanying drawings. In the drawings, wherein like reference numerals denote corresponding parts throughout the several views:

FIG. 1 is a side view in longitudinal section of a low-loss, extended-ranged, tuneable, fixed capacitor embodying the invention;

FIG. 2 is a transverse cross-sectional view taken along the line 2—2 of FIG. 1 along the direction of the arrows;

FIG. 3 is a side view in longitudinal section of a second form of low-loss, extended-range, tuneable, fixed capacitor embodying the invention; and FIG. 4 is a transverse cross-sectional view taken along the line 4—4 of FIG. 3 in the direction of the arrows.

Referring now in detail to the drawings, and considering first the embodiment of the invention illustrated in FIGS. 1 and 2, there is illustrated therein a low-loss, extended-range, tuneable, fixed capacitor designated by reference numeral 10 and comprising a stator support member 11, which is integrally formed of an electrically-conductive material such as brass, and a rotor support member 12 of a like material. The stator support member 11 comprises a cylindrical body portion 13 having a coaxial, outwardly-extending, reduced-diameter stem portion 14, the outer end of said stem portion having a cylindrical head 15. The inner end of the cylindrical head body 14 is formed with a first annular recess 16 defining a thin peripheral flange 17. The inner end of the cylindrical body portion 13 is also formed with a second annular recess 18, defining inner and outer concentric annular wall portions within which end portions of tubular stator plate elements 20 and 21, of equal lengths but of different diameters, are press-fitted in coaxial relation. The inner end of the cylindrical body portion 14 is further integrally formed with a reduced-diameter, concentric, outwardly-projecting cylindrical portion 19 extending somewhat beyond the outer end of the outer peripheral flange 17. The outer end of the cylindrical body portion 19 is provided with a shallow, concentric cylindrical recess 22 within which is received a fixed capacitor in the form of a so-called "chip." The chip capacitor 23 which, although shown as square in cross-section, may be of any cross-sectional shape, is soldered at its inner end with respect to the cylindrical body portion 19.

A tubular ground glass or ceramic dielectric and support member 24 is press-fitted at one end with respect to the inner annular wall surface of the first annular recess 16 of the stator support member 11.

The rotor support member 12 comprises a cylindrical body portion 25 formed at its inner end with a tubular concentric projection 26. The cylindrical body portion 25 is formed with an internally-threaded, concentric, through opening 27, and is partially externally threaded along its outer end, as indicated at 28. The external thread 28 extends inwardly to a point just short of an annular flange 29 formed about the outside of the cylindrical body portion 25 and defining a shoulder 30 cooperative with a hexagonal nut (not illustrated) threadable along said external thread for mounting the capacitor in a suitable chassis opening or the like.

Threadingly-received within the cylindrical body portion 25 is an externally-threaded, cylindrical rotor carriage member 31 integrally formed with concentric annular projections 32, 33. The outer annular projection 32 defines inner and outer side wall portions press-fitted with respect to which are end portions of tubular rotor elements 34 and 35, of the same length but of different diameters. The inner annular projection 33 is substantially shorter in extent with respect to the outer annular projection 32 and defines a cylindrical annular recess within which is press-fitted a short cylindrical insulating member 36 of "nylon," for example. The capacitor chip member 23 has soldered to its outer end a circular, centrally-apertured metal disc 37 formed with peripherally equidistantly spaced, angularly outwardly-directed spring fingers 38, said fingers being adapted to resiliently frictionally contact inner wall surface portion of the inner tubular rotor element 35.

The rotor end of the tubular dielectric support member 24 is press-fitted within the tubular concentric projection 26 of the rotor support member 12. It will be noted that in its assembly, the tubular stator elements 20 and 21 and the tubular rotor elements 34 and 35 are so arranged and spaced in their respective stator and rotor support members 11 and 12 that they fit in intermeshed or interspaced relation, the rotor element 35 also being of such inner diameter as to be radially spaced from the outer periphery of the axial cylindrical projecting portion 19 of the stator cylindrical body portion 13. The tubular rotor elements 34 and 35 may be moved axially with respect to the tubular stator elements 20 and 21 by turning the rotor carriage member 31 using a screwdriver inserted in a screwdriver slot 39 formed in the outer end of said carriage member. The rotor carriage member 31 is formed along its length with a non-threaded, central portion 40 at the axial ends whereof they are provided with two transverse, flat-bottomed slots 41 and 42, each of which extends in mutually spaced relation across the longitudinal axis of the rotor carriage member 31. The bottoms of the slots 41 and 42 are preferably equidistant from the longitudinal axis of the rotor carriage member 31 and are parallel to one another, both being perpendicular to the longitudinal axis. Prior to assembly of the cylindrical body portion 13, it will be axially compressed to narrow the outer ends of the slots 41 and 42 and thereby impart a permanent deformation thereof which yieldingly slightly helically misaligns the external helical threads adjacent to the slots 41 and 42. When threaded into engagement with the internal threads 27 of the rotor body portion 25, the external threads of the rotor carriage member 31 are resiliently brought back into helical alignment by the internal threads 27 with a positive frictional engagement providing self-locking action. It is to be understood that the cooperating threaded portions of the rotor carriage member 31 are precision formed for a close fit so that the degree of misalignment requiring to produce the frictional engagement is very small. This enhances the permanency and constancy of the frictional engagement during the life of the capacitor.

It will be understood that frictional contact action of the metal disc 37 affixed to the outer end of the capacitor chip member 33 along the inner tubular rotor element 35 serves to maintain said capacitor chip in parallel electrical connection with the adjustable portion of the fixed capacitor 10, no matter what its position of adjustment. In its maximum capacitance position of adjustment, as illustrated in FIG. 1, it will be seen that the insulating member 36 abuts against the outer surface of the metal disc 37 to prevent short-circuiting of the capacitor, as well as serving as an innermost limit position of adjustment of the rotor carriage member 31.

FIGS. 3 and 4 illustrate a modification of the invention utilizing a higher fixed capacitance capacitor chip member 43, said capacitor chip member necessarily being of greater length (being of the same cross-section as that of the capacitor chip member 23 in the embodiment of FIGS. 1 and 2) to provide for greater capacitance. The embodiment of FIGS. 3 and 4 differs from that illustrated in FIGS. 1 and 2 described above only in that instead of the stator support end member 11a being formed with an outwardly-projecting, cylindrical portion 19, it is formed with a coaxial, cylindrical recess 44 defining with the annular recess 18a, an annular projection 45. Also, an additional tubular stator plate element 46 is press-fitted within the cylindrical recess 44; and the inner end of the capacitor chip member 43 is soldered at its inner end against the bottom surface of the cylindrical recess 44. It will be noted that the capacitor chip member 43 is of such length as to project outwardly beyond the tubular stator plate elements 20, 21 and 46. It is also to be noted that the additional stator plate element 46 replaced the outwardly-projecting cylindrical portion 19 of the embodiment of the invention illustrated in FIGS. 1 and 2 for cooperative capacitor plate action with respect to the inner rotor element 35 of the rotor support member 12. The construction and operation of the embodiment of the invention illustrated in FIGS. 3 and 5 is otherwise the same as that of the embodiment of FIGS. 1 and 2, described above.

While there are illustrated and described herein only two forms in which the invention can conveniently be embodied in practice, it is to be understood that these forms are presented by way of example only and not in a limiting sense .

What we claim as new and desire to secure by Letters Patent is:

1. A low-loss, extended-range, tuneable fixed capacitor comprising, in combination, a pair of axially-spaced end support members, a tubular ceramic support member, end portions of said ceramic support member being press-fitted in coaxial cylindrical recesses in said end members, a first tubular capacitor plate element press-fitted at one end with respect to an annular wall surface portion of a coaxial annular recess provided in one of said support members, a second tubular capacitor plate element press-fitted at one end portion thereof with respect to an annular wall surface portion of a coaxial annular recess provided in the other of said support members, said first tubular capacitor plate element and said second tubular capacitor plate element being disposed in interspaced, coaxial relation within said ceramic support member, a fixed capacitor chip member arranged within said first and second tubular capacitor plate elements and fixed at one end with respect to and electrically joined with respect to one of said axially spaced end support members, the other of said end support members comprising a rotor carriage member, means for adjustably positioning said rotor carriage member along the axial direction, said annular recess of said other of said end support members being in said rotor carriage member, and electrical brush means fixed with respect to the outer end of said fixed capacitor chip member, and operative to make and maintain electrical contact with the other of said end support members at all adjusted positions of said rotor carriage member.

2. A low-loss, extended-range, tuneable fixed capacitor as defined in claim 1, wherein said electrical brush means comprises a circular metal disc having outwardly-directed, peripheral spring fingers resiliently contacting the inner surface of the inner one of said tubular capacitor plate elements.

3. A low-loss, extended-range, tuneable fixed capacitor as defined in claim 2, including insulating means affixed to and extending outwardly of the inner end of said rotor carriage member and adapted to be moved into abutting engagement with respect to the outside of said circular metal disc when said carriage member is in its innermost adjusted position.

4. A low-loss, extended-range, tuneable fixed capacitor as defined in claim 3, wherein said one of said end support members comprises a central, coaxial, cylindrical projection, said projection being formed at its outer end with a recess providing a seat within which is affixed said one end of said fixed capacitor chip member.

5. A low-loss, extended-range, tuneable fixed capacitor as defined in claim 3, wherein said one of said end support members comprises a central coaxial cylindrical recess providing a seat within which is affixed said one end of said capacitor chip member.

6. A low-loss, extended-range, tuneable fixed capacitor comprising, in combination, first and second axially-spaced end support members, a tubular ceramic support member, end portions of said ceramic support member being press-fitted in coaxial, cylindrical recesses in said end members, a first plurality of tubular capacitor plate elements having mutually different diameters press-fitted at end portions thereof with respect to annular wall surfaces of coaxial annular surface recesses provided in the first of said end support members, a plurality of second tubular capacitor plate elements having mutually different diameters press-fitted at end portions thereof with respect to annular wall surfaces provided in the other of said end support members, said first plurality of tubular capacitor plate elements and said second plurality of tubular capacitor plate elements being disposed in interspaced relation within said ceramic support members, a fixed capacitor chip member arranged within the innermost one of said first plurality of tubular capacitor plate elements and fixed at one end with respect to and electrically joined with respect to said first of said axially-spaced end support members, the second of said end support members comprising a rotor carriage member along the axial direction within said second end support member, said annular recesses of said second end support member being in said rotor carriage member, and electrical brush means fixed with respect to the outer end of said fixed capacitor chip member and operative to make and maintain electrical contact with said second of said end support members at all adjusted positions of said rotor carriage member.

7. A low-loss, extended-range, tuneable fixed capacitor as defined in claim 6 wherein said electrical brush means comprises a circular metal disc having outwardly-directed peripheral spring fingers resiliently contacting the inner surface of the inner one of said second plurality tubular capacitor plate elements.

8. A low-loss, extended-range, tuneable fixed capacitor as defined in claim 7, including insulating means affixed to and extending outwardly of the inner end of said rotor carriage member and adapted to be moved into abutting engagement with respect to the outside of said circular metal disc when said carriage member is in its innermost adjusted position.

9. A low-loss, extended-range, tuneable fixed capacitor as defined in claim 8 wherein said first of said end support members comprises a central, coaxial, cylindrical projection, said projection being formed at its outer end with a recess providing a seat within which is affixed said one end of said fixed capacitor chip member.

10. A low-loss, extended-range, tuneable fixed capacitor as defined in claim 8, wherein said one of said end support members comprises a central, coaxial, cylindrical recess providing a seat within which is affixed said one end of said fixed capacitor chip member.

References Cited
UNITED STATES PATENTS 3,286,139  11/1966  Edwards _____ 317—249

ELLIOT A. GOLDBERG, Primary Examiner

U.S. Cl. X.R.

317—249